(12) United States Patent
Honjo

(10) Patent No.: US 10,658,884 B2
(45) Date of Patent: May 19, 2020

(54) STATOR AND METHOD FOR MANUFACTURING THE SAME

(71) Applicant: Honda Motor Co.,Ltd., Tokyo (JP)

(72) Inventor: Satoshi Honjo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 15/708,149

(22) Filed: Sep. 19, 2017

(65) Prior Publication Data

US 2018/0083496 A1 Mar. 22, 2018

(30) Foreign Application Priority Data

Sep. 21, 2016 (JP) ................... 2016-183901

(51) Int. Cl.
*H02K 1/04* (2006.01)
*H02K 15/10* (2006.01)
*H02K 15/06* (2006.01)
*H02K 1/16* (2006.01)
*H02K 3/12* (2006.01)
*H02K 3/34* (2006.01)
*H02K 15/085* (2006.01)
*H02K 15/12* (2006.01)

(52) U.S. Cl.
CPC ............ *H02K 1/04* (2013.01); *H02K 1/165* (2013.01); *H02K 3/12* (2013.01); *H02K 3/345* (2013.01); *H02K 15/067* (2013.01); *H02K 15/085* (2013.01); *H02K 15/10* (2013.01); *H02K 15/105* (2013.01); *H02K 15/12* (2013.01)

(58) Field of Classification Search
CPC ..................................... H02K 1/04; H02K 1/165; H02K 3/12; H02K 3/345; H02K 15/085; H02K 15/105; H02K 15/12
See application file for complete search history.

(56) References Cited

U.S. PATENT DOCUMENTS 6,995,491 B2 * 2/2006 Kimura .................. H02K 3/345
                                                        310/215
8,203,251 B2 * 6/2012 Ishizuka ................. H02K 3/50
                                                        310/254.1
(Continued)

FOREIGN PATENT DOCUMENTS

CN 101341396 1/2009
CN 105634159 6/2016
(Continued)

OTHER PUBLICATIONS

"Office Action of China Counterpart Application," dated Mar. 11, 2019, with English translation thereof, p. 1-p. 14.
(Continued)

*Primary Examiner* — Emily P Pham
(74) *Attorney, Agent, or Firm* — JCIPRNET

(57) ABSTRACT

A stator having a structure in which an insulating paper is easily inserted into a slot and a method for manufacturing the same are provided. The stator includes a stator core (21) alternately having teeth (32) and slots (34) in a circumferential direction, a coil (33) installed at the stator core (21), and an insulating paper (60) provided around the coil (33) while being accommodated in the slot (34) and having a folded portion (64) in a lengthwise direction of the slot (34).

5 Claims, 7 Drawing Sheets

(56) References Cited

U.S. PATENT DOCUMENTS

| | | | | |
|---|---|---|---|---|
| 8,595,915 B2* | 12/2013 | Morikaku | ............... | H02K 3/345 29/592.1 |
| 2002/0014806 A1* | 2/2002 | Senoo | .................... | H02K 3/345 310/215 |
| 2012/0001516 A1* | 1/2012 | Hisada | ................... | H02K 1/165 310/216.069 |
| 2014/0215806 A1* | 8/2014 | Yamaguchi | .......... | H02K 15/068 29/596 |
| 2016/0036282 A1* | 2/2016 | Nakayama | ............... | H02K 3/30 310/208 |
| 2018/0159398 A1* | 6/2018 | Koga | .................... | H02K 15/12 |

FOREIGN PATENT DOCUMENTS

| | | |
|---|---|---|
| CN | 105811628 | 7/2016 |
| CN | 105896757 | 8/2016 |
| JP | S51101509 | 8/1976 |
| JP | S5780149 | 5/1982 |
| JP | H04347551 | 12/1992 |
| JP | H09219949 | 8/1997 |
| JP | 2005184919 | 7/2005 |
| JP | 2015-122861 | 7/2015 |

OTHER PUBLICATIONS

"Office Action of Japan Counterpart Application," with partial English translation thereof, dated Feb. 6, 2018, p. 1-p. 9.

"Office Action of China Counterpart Application," with English translation thereof, dated Sep. 30, 2019, p. 1-p. 13.

"Office Action of China Counterpart Application", dated Mar. 17, 2020, with English translation thereof, pp. 1-9.

* cited by examiner

STATOR AND METHOD FOR MANUFACTURING THE SAME

CROSS-REFERENCE TO RELATED APPLICATION

This application claims the priority benefit of Japan application serial no. 2016-183901, filed on Sep. 21, 2016. The entirety of the above-mentioned patent application is hereby incorporated by reference herein and made a part of this specification.

BACKGROUND OF THE INVENTION

Field of the Invention

The present invention relates to a stator and a method for manufacturing the same.

Description of Related Art

Conventionally, a rotary electric machine including a stator and a rotor is known. Teeth extending in a radial direction of the stator are provided at the stator of the rotary electric machine. A slot through which a coil can be inserted is formed between the teeth adjacent in a circumferential direction of the stator.

In Patent Document 1, there is disclosed a technology in which an insulating paper having a through hole for infiltrating varnish is provided along an inner wall surface of the slot around a coil.

Prior Art Document

Patent Documents

[Patent Document 1] Japanese Unexamined Patent Application, Publication No. 2015-122861

SUMMARY OF THE INVENTION

Recently, as power performance of rotary electric machines has been enhanced, more stators having a long axial length have appeared. As a result, a length of the insulating paper and the slot extending in an axial direction of the stator has also increased. Accordingly, when the insulating paper is inserted from one end of the slot toward the other end thereof in a lengthwise direction, a frequency of buckling of the insulating paper may increase, and a decrease in productivity of the stator may be caused.

Therefore, the present invention provides a stator having a structure in which an insulating paper is easily inserted into a slot and a method for manufacturing the same.

A stator (e.g., a stator 20 of an embodiment) of a first invention includes a stator core (e.g., a stator core 21 of the embodiment) alternately having teeth (e.g., teeth 32 of the embodiment) and slots (e.g., slots 34 of the embodiment) in a circumferential direction, a coil (e.g., a coil 33 of the embodiment) installed at the stator core, and insulating papers (insulating paper 35 and wedge insulating papers 60 and 65 of the embodiment) disposed between an inner circumferential surface of the slots and the coil, wherein at least one (e.g., a wedge insulating paper 60 or 65 of the embodiment) of the insulating papers has a first side portion (e.g., a first side portion 61 of the embodiment) which faces one of two teeth on both sides of each slot in the circumferential direction, a second side portion (e.g., a second side portion 62 of the embodiment) which faces the other one of the two teeth, and a third side portion (e.g., a third side portion 63 of the embodiment) which connects between the first side portion and the second side portion, and the third side portion has a folded portion (a third folded portion 64 of the embodiment) in a lengthwise direction of the slot.

In a stator of a second invention, each slot may have an opening (e.g., a slot opening 34a of the embodiment) which is opened between the teeth, and the folded portion may have a convex shape toward the opening.

In a stator of a third invention, the coil and the insulating paper may be impregnated with varnish (e.g., varnish 37 of the embodiment), and the varnish may permeate between the coil and the third side portion having the folded portion.

A method for manufacturing a stator of a fourth invention includes preparing a stator core alternately having teeth and slots in a circumferential direction, installing a coil in the stator core, moving an insulating paper, which has a first side portion which faces one of two teeth on both sides of each slot in the circumferential direction, a second side portion which faces the other one of the two teeth and a third side portion which connects between the first side portion and the second side portion and in which the third side portion has a folded portion in a lengthwise direction of the slot, in a lengthwise direction of the slot and inserting the insulating paper into the slot, and disposing the insulating paper between an inner circumferential surface of the slot and the coil.

In a method for manufacturing a stator of a fifth invention, in an opening through which each slot is opened between the teeth, the folded portion may have a convex shape toward the opening when the insulating paper is inserted into the slot.

A method for manufacturing a stator of a sixth invention may further include impregnating the coil and the insulating paper with varnish in a state in which the coil and the insulating paper are arranged in the slots, and a gap through which the varnish permeates may be provided between the coil and the third side portion having the folded portion.

According to the first invention, since the insulating paper having the folded portion in the lengthwise direction of the slots is disposed between the inner circumferential surface of the slots and the coil, the insulating paper does not easily buckle when the insulating paper moves in a lengthwise direction thereof. Therefore, even when an axial length of the stator is long, the insulating paper can be easily inserted between the inner circumferential surface of the slots and the coil, and electrical insulation between the stator core and the coil can be ensured.

According to the second invention, since the folded portion of the insulating paper has the convex shape toward the opening through which the slots are opened between the teeth, an internal cross-sectional area surrounded by the insulating paper can be further widened, and thus a space factor of the coil with respect to the cross-sectional area of the slots can be increased.

According to the third invention, since permeation of the varnish can be promoted along the folded portion of the insulating paper, a positional relationship between the coil and the insulating paper can be fixed by the impregnated varnish, and thus performance can be stabilized.

According to the fourth invention, since the insulating paper having the folded portion in the lengthwise direction of the slots can move in the lengthwise direction of the slots, even when the axial length of the stator is long, the insulating paper does not easily buckle when the insulating paper moves in a lengthwise direction thereof. Due to the insulating paper, the electrical insulation between the stator core and the coil can be ensured.

According to the fifth invention, since the folded portion of the insulating paper has the convex shape toward the openings through which the slots are opened between the teeth, the internal cross-sectional area surrounded by the insulating paper can be further widened, and thus the space factor of the coil with respect to the cross-sectional area of the slots can be increased. Also, when the insulating paper is inserted into the slots, the folded portion is guided along the openings, and a cross-sectional shape of the insulating paper can be stabilized when the insulating paper is inserted.

According to the sixth invention, since the gap through which the varnish permeates is provided between the coil and the third side portion having the folded portion of the insulating paper, the permeation of the varnish can be promoted along the folded portion of the insulating paper. As a result, the positional relationship between the coil and the insulating paper can be fixed by the impregnated varnish, and thus the performance can be stabilized.

DESCRIPTION OF THE EMBODIMENTS

Hereinafter, an embodiment of the present invention will be described with reference to the drawings.

Figure 1:
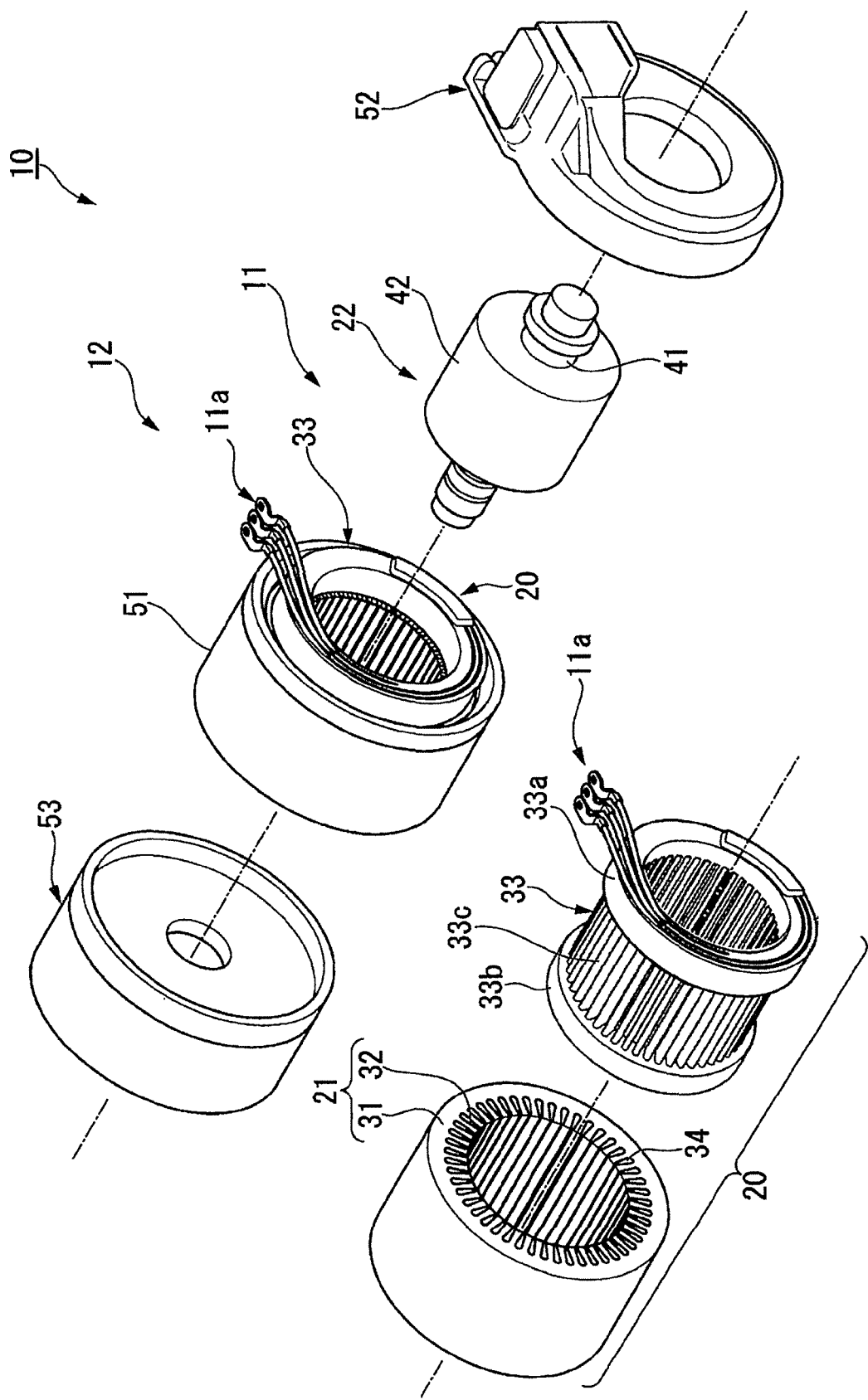
FIG. 1 is a perspective view schematically illustrating a constitution of a rotary electric machine of a rotary electric machine unit according to an embodiment in which the rotary electric machine is disassembled.
Figure 2:
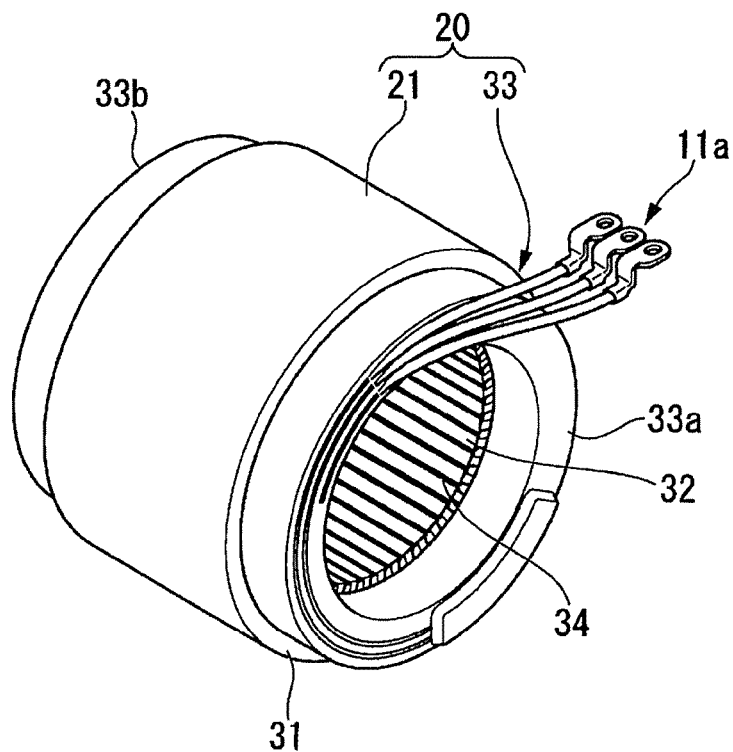
FIG. 2 is a perspective view of a stator according to the embodiment.

FIG. 1 is a perspective view schematically illustrating a constitution of a rotary electric machine of a rotary electric machine unit according to an embodiment in which the rotary electric machine is disassembled. FIG. 2 is a perspective view of a stator 20. A rotary electric machine unit 10 illustrated in FIG. 1 is disassembled into a second cover 53, a stator 20 accommodated in a housing main body 51, a rotor 22 and a first cover 52 along an upper oblique line. Further, the stator 20 is disassembled into a stator core 21 and a coil 33 along a lower oblique line.

The rotary electric machine unit 10 includes a rotary electric machine 11 which has the stator 20 and the rotor 22, and a housing 12 which accommodates the rotary electric machine 11 therein. The rotary electric machine 11 according to the embodiment is an inner rotor type in which the rotor 22 is disposed at a radial inside of the stator 20 and may be a three-phase brushless DC motor or the like.

Further, in the following description, the radial inside of the stator 20 may be simply referred to as a "radial inside," and a radial outside of the stator 20 may also be simply referred to as a "radial outside." Also, an axial direction of the stator 20 may be simply referred to as an "axial direction." A circumferential direction of the stator 20 (specifically, a back yoke 31) may be simply referred to as a "circumferential direction."

The housing 12 includes the housing main body 51 which fixes the stator 20, and the first cover 52 and the second cover 53 that sandwich the housing main body 51 from both sides in the axial direction. The rotor 22 includes a rotary shaft 41 which serves as an output shaft of a motor and a cylindrical rotor core 42 which is coaxially fixed on an outer circumference of the rotary shaft 41. The rotor 22 is rotatably supported by bearings (not illustrated) provided inside the first cover 52 and the second cover 53 from both sides in a lengthwise direction (an axial direction) of the rotary shaft 41.

The stator 20 includes the cylindrical stator core 21 and the three-phase coil 33 which is installed at the stator core 21 via an insulating member (for example, an insulating paper or the like). The stator core 21 includes a cylindrical back yoke 31 and a plurality of teeth 32 which protrude from an inner circumferential surface of the back yoke 31 toward a radial inside. Groove-shaped slots 34 are formed between the teeth 32 adjacent to each other in a circumferential direction of the stator core 21. That is, the teeth 32 and the slots 34 are alternately disposed in the circumferential direction of the stator core 21.

The coil 33 includes two coil ends 33a and 33b (ends of the coil) which protrude to both sides in an axial direction, and a coil side 33c (a side of the coil) which extends in the axial direction between the two coil ends 33a and 33b. The coil side 33c is an in-slot conductor and is accommodated in the slots 34 in a state in which the coil 33 is installed at the stator core 21. Both ends of the slots 34 in the axial direction are opened to both sides of the stator core 21 in the axial direction so that the coil side 33c and the coil ends 33a and 33b can be continuous.

Further, in the coil 33 illustrated in FIGS. 1 and 2, details of the three-phase (U phase, V phase and W phase) coils are omitted, and the three phase coils are illustrated as if they were integrated. A terminal portion 11a of the coil 33 has an end of each of the three-phase coils. In each of the coil ends 33a and 33b, an interphase insulating paper (not illustrated) can be arranged between the coils having different phases.

Figure 3:
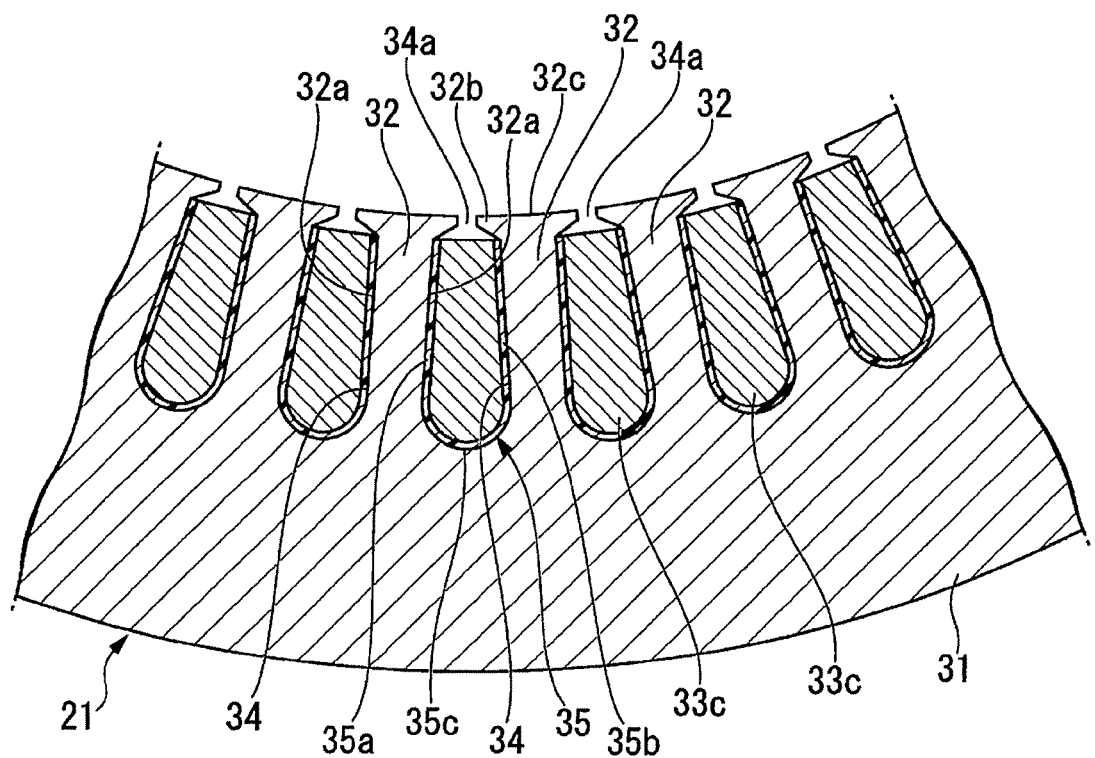
FIG. 3 is a partial cross-sectional view enlargedly illustrating a part of the stator according to the embodiment.

A part of the stator 20 is enlarged and illustrated in FIG. 3. In FIG. 3, as the insulating paper, only a slot insulating paper 35 disposed over substantially an entire inner peripheral surface of the slot 34 is illustrated, and other insulating paper is omitted.

Each of the teeth 32 includes a tooth side portion 32a which is a surface opposing the tooth 32 adjacent in a circumferential direction, a tip protruding portion 32b which protrudes from the tooth side portion 32a in the circumferential direction of the stator core 21, and an inner circumferential surface 32c which is a surface opposing an outer circumferential surface of the rotor 22 (see FIG. 1). The slots 34 have slot openings 34a which are openings opened between the tip protruding portions 32b of the adjacent teeth 32.

The slot openings 34a extend over the entire length of the slots 34, that is, an axial length of the stator core 21. A change in magnetic flux in a case which a field of a permanent magnet or the like provided in the rotor 22 faces the teeth 32 and in a case which a field of a permanent magnet or the like provided in the rotor 22 faces the slots 34 can be suppressed when the tip protruding portions 32b are formed at the teeth 32 and thus the area of the inner circumferential surface 32c facing the rotor 22 increases. Accordingly, the widths of the slot openings 34a in the circumferential direction are narrower than an interval between the tooth side portions 32a facing each other across the slots 34.

The slot insulating paper 35 and the coil side 33c are accommodated in each of the slots 34. The slot insulating paper 35 includes a pair of side portions 35a and 35b in contact with the tooth side portions 32a, and a curved portion 35c having a curved shape in an approximate U shape on the back yoke 31 side. The slot insulating paper 35 can be manufactured by curving a strip-shaped (a tape-shaped) insulating paper along a substantially center line in a lengthwise direction and forming the curved portion 35c which is continuous in the lengthwise direction. The side portions 35a and 35b of the slot insulating paper 35 accommodated in the slots 34 are inserted therein deeper than the slot openings 34a (for example, inside the tip protruding portions 32b of the teeth 32).

Figure 4:
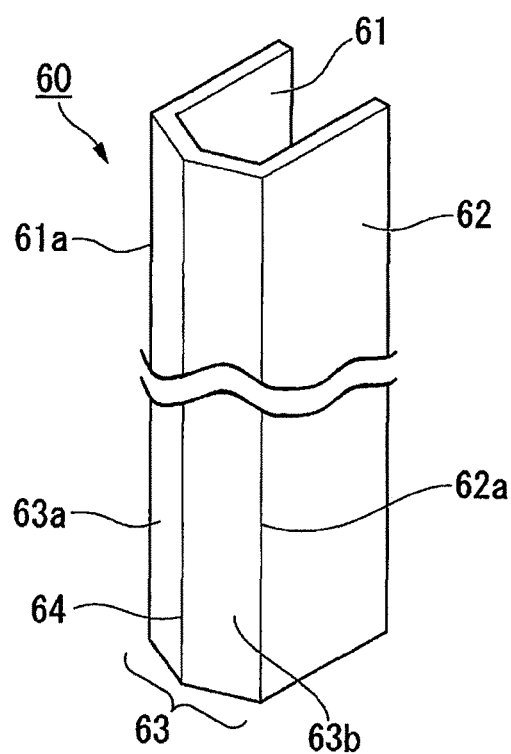
FIG. 4 is a perspective view illustrating a constitution of an intermediate portion of a wedge insulating paper according to the embodiment in which the intermediate portion is omitted.

For example, a wedge insulating paper 60 illustrated in FIG. 4 is provided at a portion of the slot opening 34a side, which is not covered with the slot insulating paper 35, around the coil side 33c. The wedge insulating paper 60 includes a first side portion 61, a second side portion 62 and a third side portion 63. The first side portion 61 and the second side portion 62 are portions which are in contact with pairs of the tooth side portions 32a facing each other. The third side portion 63 is a portion which connects between the first side portion 61 and the second side portion 62. A cross-sectional shape of the wedge insulating paper 60 perpendicular to a lengthwise direction thereof has an approximate U shape or V shape.

A first folded portion 61a extending in the lengthwise direction of the wedge insulating paper 60 is formed between the first side portion 61 and the third side portion 63. In the same manner, a second folded portion 62a extending in the lengthwise direction of the wedge insulating paper 60 is formed between the second side portion 62 and the third side portion 63. In a width direction of the wedge insulating paper 60, the first folded portion 61a and the second folded portion 62a are provided on the same side edge portions of the first side portion 61 and the second side portion 62, respectively. Each of inner surfaces facing the first side portion 61 and the second side portion 62 is included in the same side surfaces of the wedge insulating paper 60.

Further, the third side portion 63 has a third folded portion 64 which extends in the lengthwise direction of the wedge insulating paper 60. The third folded portion 64 is a folded portion 64 in the third side portion 63 which is formed in the lengthwise direction of the slot 34. The third folded portion 64 is formed substantially in parallel with the first folded portion 61a and the second folded portion 62a without intersecting with any one of the first folded portion 61a and the second folded portion 62a.

The wedge insulating paper 60 can be manufactured of the strip-shaped (tape-shaped) insulating paper by forming fold lines at positions corresponding to the first folded portion 61a, the second folded portion 62a and the third folded portion 64. Since the folded portions are formed in advance before an inserting operation of the wedge insulating paper 60 is performed, workability is improved when the wedge insulating paper 60 is installed at the stator core 21.

Since the third side portion 63 has the folded portion 64, the third side portion 63 is divided into a first region 63a which is located between the first folded portion 61a and the third folded portion 64 and a second region 63b which is located between the second folded portion 62a and the third folded portion 64. By forming an angle of less than 180° between the first region 63a and the second region 63b, rigidity of the third side portion 63 against bending is improved as compared with a case in which the third side portion 63 is flat.

Figure 5:
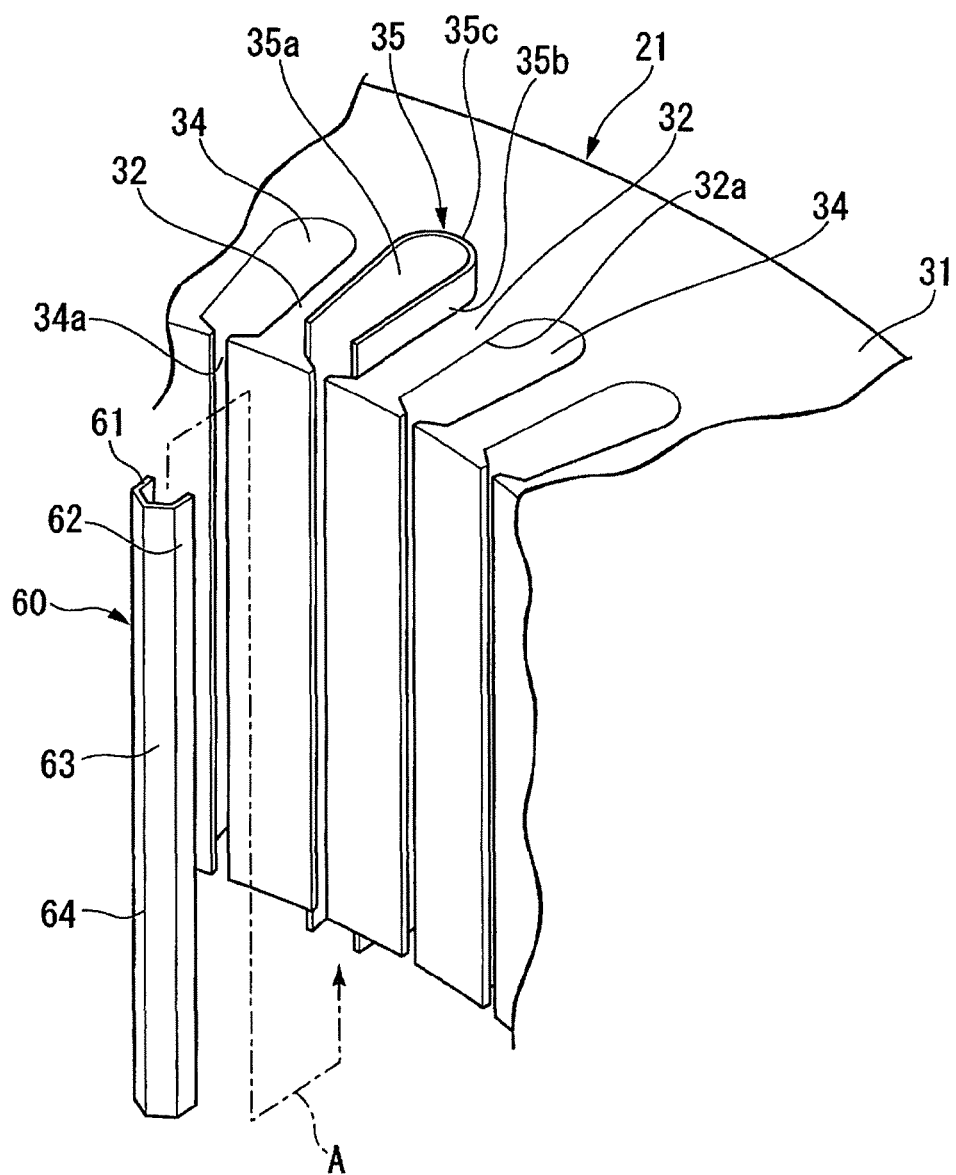
FIG. 5 is a perspective view illustrating an arrangement of the insulating paper with respect to a stator core in which the stator according to the embodiment is disassembled.

FIG. 5 is a perspective view schematically illustrating an arrangement of the insulating paper with respect to the stator core 21 of the stator 20 according to the embodiment. In FIG. 5, only the slot insulating paper 35 and the wedge insulating paper 60 used in one of the plurality of slots 34 formed in the stator core 21 are illustrated. The slot insulating paper 35 illustrated in FIG. 5 is accommodated in the slot 34, but the wedge insulating paper 60 is in a position outside the slot 34 which is shifted to the radial inside along the one-dot chain line in FIG. 5. In FIG. 5, the coil 33 is omitted. Further, in the following description, the slot insulating paper 35 and the wedge insulating paper 60 may be collectively referred to as "insulating papers 35 and 60."

Both ends of the slot insulating paper 35 in the lengthwise direction protrude outward from both ends of the slot 34. Although not illustrated in FIG. 5, it is also possible to adopt a constitution in which both end portions of the slot insulating paper 35 in the lengthwise direction are folded back and abut both end surfaces of the stator core 21 in the axial direction. This case is preferable because it is difficult for the slot insulating paper 35 to be displaced with respect to the lengthwise direction of the slot 34.

When the wedge insulating paper 60 is inserted into the slot 34, for example, as shown by an arrow A, the lengthwise direction of the wedge insulating paper 60 can be aligned with the lengthwise direction of the slot 34, and the wedge insulating paper 60 can be inserted into the slot 34 from one end of the slot 34 in the length direction.

Figure 6:
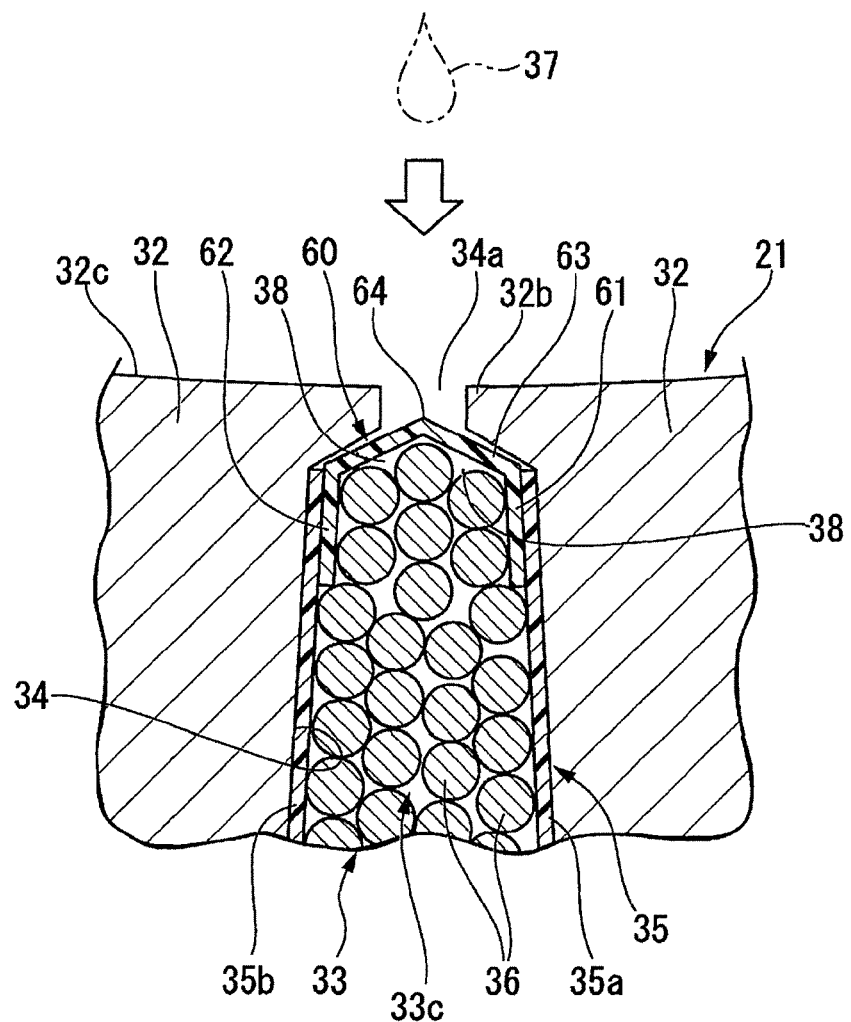
FIG. 6 is a partial cross-sectional view enlargedly illustrating a state in which the wedge insulating paper is accommodated in a slot and a state in which varnish is dropped into the slot in the stator according to the embodiment.

FIG. 6 enlargedly and schematically illustrates a state in which the wedge insulating paper 60 is accommodated in the slot 34 and a state in which varnish 37 is dropped into the slot 34. Further, the varnish 37 in FIG. 6 schematically shows that the droplet-shaped varnish 37 is dropped from above and does not limit an actual state of the varnish 37. For example, the varnish 37 may not be limited to an intermittent droplet shape but may be supplied in a continuous liquid column shape.

The first side portion 61 and the second side portion 62 of the wedge insulating paper 60 overlap the side portions 35a and 35b of the slot insulating paper 35. Further, the third side portion 63 of the wedge insulating paper 60 is disposed at a portion in which the periphery of the coil side 33c is not covered with the slot insulating paper 35, and a space between the coil side 33c and the tip protruding portion 32b of the tooth 32 is electrically insulated. Accordingly, a portion of the coil 33 which is accommodated in the slot 34 is covered with the insulating papers 35 and 60, and thus a conductive wire 36 forming the coil side 33c is prevented from coming in contact with an inner circumferential surface of the slot 34.

The third folded portion 64 of the wedge insulating paper 60 may be located within the slot opening 34a but does not protrude to the radial inside further than the inner circumferential surfaces 32c of the teeth 32. Therefore, when the rotor 22 (refer to FIG. 1) disposed at the radial inside of the stator 20 rotates, interference of the third folded portion 64 with the rotor 22 can be avoided.

As an example of an order of accommodating the coil side 33c and the insulating papers 35 and 60 in the slot 34, first, the slot insulating paper 35 may be disposed in the empty slot 34, and the coil side 33c may be accommodated in the slot 34, and then the wedge insulating paper 60 may be inserted between the inner circumferential surface of the slot 34 and the coil side 33c.

Further, the coil side 33c and the wedge insulating paper 60 may be accommodated in the slot 34 at the same time or subsequently in one process. That is, there is no restriction on an order of the process in which the coil 33 is inserted into the stator core 21 and the process in which the wedge insulating paper 60 having the folded portion 64 is inserted into the slot 34. However, the process in which the wedge insulating paper 60 is disposed between the inner circumferential surface of the slot 34 and the coil side 33c is performed with completion of both of the processes.

When the coil side 33c is accommodated in the slot 34, the conductive wire 36 forming the coil side 33c can be inserted into the slot 34 from the slot opening 34a because a space between the slot insulating paper 35 and the slot opening 34a is empty. Since the coil 33 can be installed at the stator core 21 even though the coil 33 is not a segment conductor type coil (a SC coil), a welding process of a conductor in a segment conductor can be omitted.

However, when the wedge insulating paper 60 is inserted into the slot 34 in a state in which the coil side 33c is accommodated in the slot 34, a resistance force due to friction or the like on both surfaces of the wedge insulating paper 60 may be easily generated between the inner circumferential surface of the slot 34 and the coil side 33c. When an axial length of the stator core 21 is long, a length of each of the slot 34 and the wedge insulating paper 60 is also increased. When the folded portion 64 is not provided on the third side portion 63, the wedge insulating paper may buckle while being inserted into the slot. When the wedge insulating paper buckles, it is difficult to continuously perform an inserting operation, and it is necessary to extract the buckled wedge insulating paper and replace it with a new wedge insulating paper and to start the operation again, and thus material and operational costs are increased, and productivity is also reduced.

According to the wedge insulating paper 60 of the embodiment, since the folded portion 64 is provided on the third side portion 63, the rigidity of the wedge insulating paper 60 is increased, and durability (toughness) against a compression load in the lengthwise direction is improved. Since the first side portion 61 and the second side portion 62 of the wedge insulating paper 60 are inserted between the side portions 35a and 35b of the slot insulating paper 35 and the coil side 33c, an approximately flat shape is preferable. Since a contact area of the third side portion 63 with the slot insulating paper 35 is small, even if the folded portion 64 is provided, it is possible to suppress an increase in the resistance force when the wedge insulating paper 60 is inserted into the slot 34.

In the wedge insulating paper 60 of the embodiment, the folded portion 64 has a convex shape toward the slot opening 34a. As the third side portion 63 is guided by the tip protruding portions 32b of the teeth 32 on both sides of the folded portion 64 in a width direction, deformation (for example, bending deformation) of the third side portion 63 in a transverse direction intersecting with a lengthwise direction can be suppressed. As a result, it is possible to stabilize the cross-sectional shape of the wedge insulating paper 60 at the time of the inserting operation and to suppress the buckling of the wedge insulating paper 60.

Further, since the folded portion 64 has the convex shape toward the slot opening 34a, an internal cross-sectional area surrounded by the inner circumferential surface of the slot 34 or the slot insulating paper 35 and the wedge insulating paper 60 becomes wider. Accordingly, a space factor of the coil side 33c with respect to the cross-sectional area of the slot 34 can be increased.

After the coil side 33c and the insulating papers 35 and 60 are accommodated in the slot 34, a process in which the varnish 37 is injected and cured into the slot 34 can be provided. Accordingly, since the coil side 33c and the insulating papers 35 and 60 are fixed to each other and also fixed to the inner circumferential surface of the slot 34, the coil 33 is mechanically durable even when vibration of the stator 20 or the like is generated during an operation of the rotary electric machine 11. Furthermore, since a gap between the conductive wires 36 forming the coil side 33c is filled with the varnish 37, moisture intrusion is suppressed, and thus moisture resistance is improved, and thermal conductivity is improved, and thus heat exhaust is easily performed.

As the varnish 37, for example, an electrically insulating composition containing a curable resin having fluidity (for example, a liquid phase) can be used. To evenly supply the varnish 37 into the slots 34, there may be a method in which, while the axial direction (i.e., the lengthwise direction of the slots 34) is made substantially horizontal (refer to, for example, FIG. 2) and the slot openings 34a are directed upward, the varnish 37 is dropped toward each of the slots 34. In this case, movement of the varnish 37 along the slots 34 is performed using a capillary phenomenon, and thus it possible to suppress deviation of the varnish 37 due to the force of gravity. A filling ratio of the varnish 37 in the slots 34 can be appropriately set in consideration of electrical insulation, mechanical fixation and so on.

A driving force applied to the varnish 37 due to the capillary phenomenon is larger as a cross-sectional area of a gap 38 formed between the conductive wire 36 and the insulating papers 35 and 60 is smaller. However, when the cross-sectional area of the gap 38 is small, a flow rate of the varnish 37 passing through the gap 38 is reduced. When the varnish 37 is supplied from the slot openings 34a, a force which allows the varnish 37 to flow radially outward is generated by a force of gravity and a centrifugal force due to rotation of the stator 20.

Therefore, to evenly infiltrate the varnish 37 in the slots 34, it is preferable to maintain a balance between a flow in the axial direction and a flow in the radial direction. When the flow in the radial direction is excessively fast, a time required for the varnish 37 to reach the back yoke 31 side (refer to FIG. 3) at the bottoms of the slots 34 may be shorter, and thus the varnish 37 may overflow from the slot openings 34a before being evenly distributed in the axial direction.

According to the wedge insulating paper 60 of the embodiment, since the third side portion 63 has the folded portion 64, the cross-sectional area of the gap 38 in the vicinity of the third side portion 63 can be wider, and the flow of the varnish 37 in the axial direction can be promoted. Therefore, even when the axial length is long, the varnish 37 can be efficiently infiltrated into the slots 34, and a tact time required for impregnating with the varnish 37 can be shortened.

A dropping place of the varnish 37 in the lengthwise direction of the slots 34 is not particularly limited, but one or two or more places may be provided on the slots 34. It is also possible to move the dropping place of the varnish 37 continuously or stepwise in the lengthwise direction of the slots 34. As a method for supplying the varnish 37 into other slots 34 in the circumferential direction, there may be a method for rotating the stator core 21 around an axis thereof.

Figure 7:
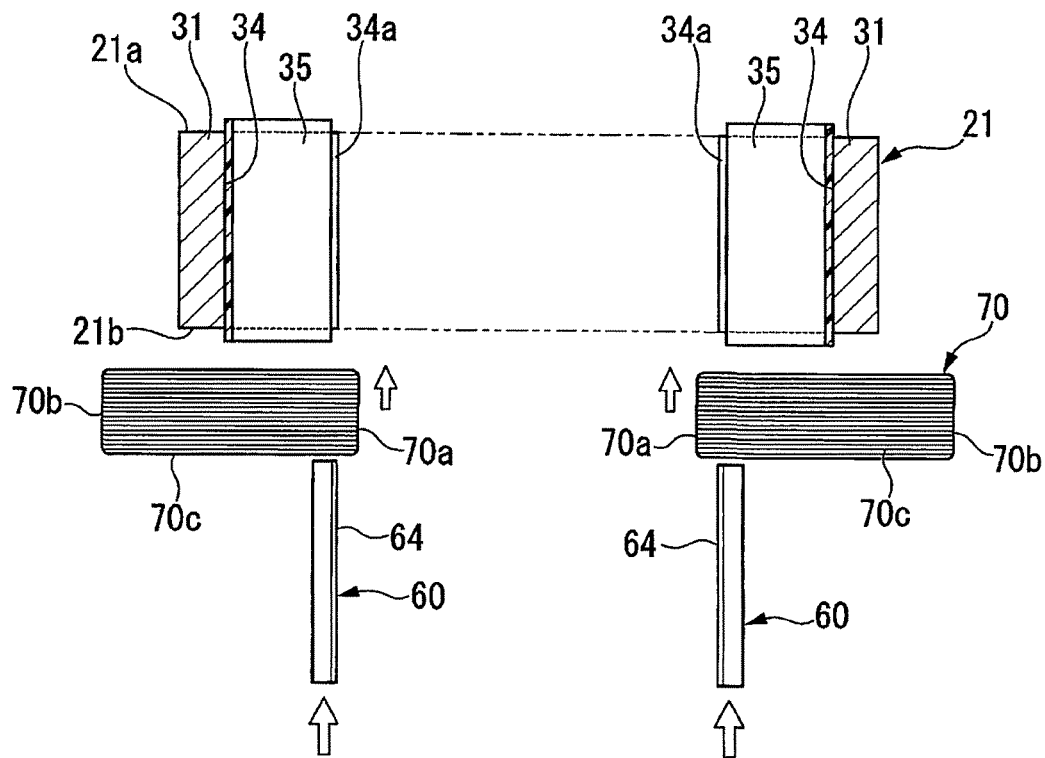
FIG. 7 is a cross-sectional view illustrating a state in which a coil and the wedge insulating paper are being inserted into the stator core according to the embodiment.
Figure 8:
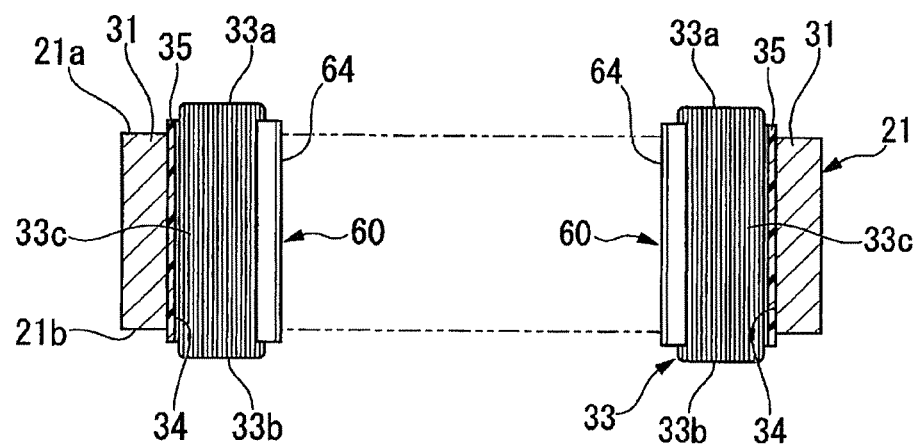
FIG. 8 is a cross-sectional view illustrating a state in which the coil and the wedge insulating paper are inserted into the stator core according to the embodiment.

Next, a process in which the coil 33 and the wedge insulating paper 60 are installed at the stator core 21 will be described with reference to FIGS. 7 and 8. FIG. 7 illustrates a state in which the coil 70 and the wedge insulating paper 60 before installation are disposed below the stator core 21 while the slot insulating paper 35 is installed at the slot 34. FIG. 8 illustrates a state after the coil 33 and the wedge insulating paper 60 are installed at the stator core 21.

In general, before being installed at the stator core 21, the coil 70 is a one-phase coil among the three-phase coils 33 (refer to FIGS. 1 and 2). That is, the coil 70 is installed at the stator core 21 one phase at a time. However, it is also possible to simultaneously install the three-phase coils in the stator core 21. Also, in FIG. 7, only two portions of the coil 70 opposing each other in the circumferential direction of the stator core 21 are illustrated, but the entire one-phase coil 70 is distributed over an entire circumference of the stator core 21.

The coil 70 has an inner curved portion 70a which is curved to protrude inward, an outer curved portion 70b which is curved to protrude outward, and a radially extending portion 70c which extends in the radial direction. The coil 70 which is wound in advance has a wave shape along the circumference of the stator core 21 so that the inner curved portion 70a and the outer curved portion 70b are alternately formed in the circumferential direction of the stator core 21. The radially extending portion 70c is formed to have a portion which transitions from the inner curved portion 70a to the outer curved portion 70b and a portion which transitions from the outer curved portion 70b to the inner curved portion 70a.

If the inner curved portion 70a is moved above the stator core 21, for example, by a sliding member (not illustrated) which moves upward from a lower side, the inner curved portion 70a becomes the coil end 33a which protrudes upward further than an upper surface 21a of the stator core 21. The outer curved portion 70b remains below a lower surface 21b of the stator core 21 and becomes the coil end 33b. The radially extending portion 70c is pushed into the slot 34 from the slot opening 34a and becomes the coil side 33c. After the three-phase coil 33 is installed at the stator core 21, the coil ends 33a and 33b are appropriately formed.

Further, the wedge insulating paper 60 is moved to a side of the coil side 33c, for example, by pressing a pusher (not illustrated) which moves upward from a lower side. Also, in FIG. 7, an upper end of the wedge insulating paper 60 is positioned below the coil 70, but a part or the whole of the wedge insulating paper 60 may be arranged at a position at which it vertically overlaps the coil 70 before being installed at the stator core 21 in advance.

The installation of the coil 70 in the stator core 21 and the insertion of the wedge insulating paper 60 into the slot 34 can be performed manually but may be performed using a device such as an inserter (not illustrated). The inserter may have a sliding member (a movable member) on the radial inside of the stator core 21 and may have a fixing member (not illustrated) adjacent to the movable member. Although an arrangement of the movable member and the fixing member in the circumferential direction of the stator core 21 is not particularly limited, the movable member and the fixing member may be alternately arranged, and the fixing member may be arranged on one side or both sides of the movable member.

Further, in FIG. 8, one of the two coil ends 33a and 33b which is located on an upper side of the stator core 21 is the coil end 33a, and the other one which is located on a lower side of the stator core 21 is the coil end 33b. In FIG. 1 and FIG. 2, the one that has a terminal portion 11a is the coil end 33a, and the other one that does not have the terminal portion 11a is the coil end 33b. However, the terminal portion 11a may be provided on either of the upper and lower sides of the stator core 21 in FIG. 8.

Figure 9:
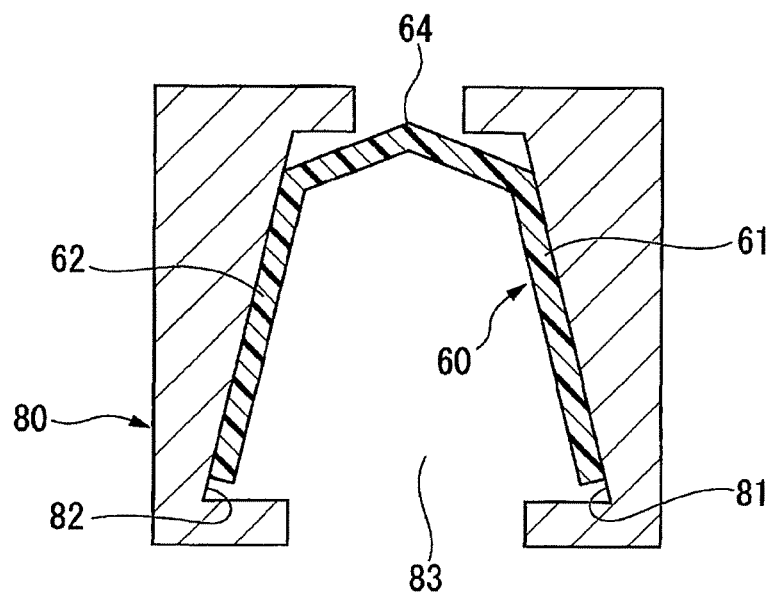
FIG. 9 is a cross-sectional view illustrating an example of a fitting jig of the wedge insulating paper according to the embodiment.

Next, an example of a fitting jig 80 which can be used for the inserter will be described with reference to FIG. 9. FIG. 9 is a cross-sectional view illustrating a state in which the wedge insulating paper 60 is disposed in an internal space 83 of the fitting jig 80 as a cross-section in a direction perpendicular to the lengthwise direction of the wedge insulating paper 60.

The fitting jig 80 includes a first holding portion 81 which holds the first side portion 61 of the wedge insulating paper 60 and a second holding portion 82 which holds the second side portion 62 of the wedge insulating paper 60. When the wedge insulating paper 60 is installed at the slot 34 by the inserter, the wedge insulating paper 60 can be held by the fitting jig 80 before being inserted into the slot 34.

When the folded portion 64 is not provided on the third side portion 63, the wedge insulating paper may buckle while being inserted between the first holding portion 81 and the second holding portion 82. When the wedge insulating paper buckles, it is difficult to continuously perform the inserting operation, and it is necessary to extract the buckled wedge insulating paper and replace it with a new wedge insulating paper and to start the operation again, and thus the material and operational costs are increased, and the productivity is also reduced.

In the wedge insulating paper 60 of the embodiment, since the folded portion 64 is provided on the third side portion 63, the buckling of the wedge insulating paper 60 can be suppressed when the wedge insulating paper 60 is being inserted into the fitting jig 80.

Figure 10:
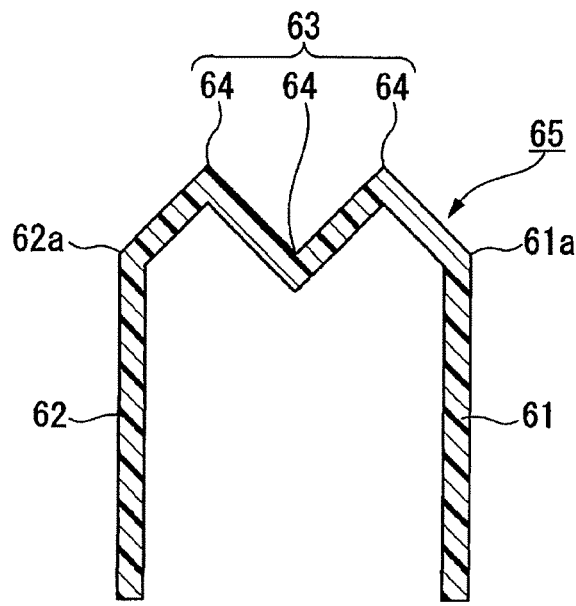
FIG. 10 is a cross-sectional view illustrating a modified example of the wedge insulating paper according to the embodiment.

FIG. 10 illustrates a modified example of the wedge insulating paper. A wedge insulating paper 65 illustrated in FIG. 10 has two or more folded portions 64 provided on the third side portion 63. A direction of the folded portions 64 may be a convex (externally folded) shape which protrudes to an opposite side to the first side portion 61 and the second side portion 62 and may be a concave (internally folded) shape which protrudes to the same side as the first side portion 61 and the second side portion 62. The third side portion 63 of the wedge insulating paper 65 may have both of the folded portion 64 having the convex (externally folded) shape and the folded portion 64 having the concave (internally folded) shape.

In addition, the present invention is not limited to the embodiments described with reference to the drawings, and various modifications are conceivable within the technical scope thereof.

In the above-described embodiment, an example in which the folded portion is provided on the third side portion of the wedge insulating paper disposed on the slot opening side has been described. However, in the slot insulating paper arranged on the back yoke side, the third side portion having the folded portion may also be provided. By providing the folded portion on the back yoke side of the slot insulating paper, the buckling of the slot insulating paper can be suppressed when the slot insulating paper is inserted into the slot. For example, the folded portion (not illustrated) in the lengthwise direction of the slot 34 may be formed in the curved portion 35c of the slot insulating paper 35 illustrated in FIGS. 3 and 5.

When the insulating paper having the folding portion on the third side portion is the slot insulating paper, the process in which the coil is installed at the stator core can be performed after the process in which the slot insulating paper having the folded portion is inserted into the slot. By accommodating the coil side in the slot, it is possible to perform the process in which the insulating paper is disposed between the inner circumferential surface of the slot and the coil.

In one or more slots or all slots, the stator may have one or both of the slot insulating paper having the folded portion on the third side portion and the wedge insulating paper having the folded portion on the third side portion.

A material of the insulating paper (also referred to as an insulating sheet) is not particularly limited, but if the material is a polymer material (a synthetic resin) such as polyester, an aliphatic polyamide (nylon), an aromatic polyamide (aramid) or a polyimide, it is preferable because it has better heat resistance than wood pulp paper. The insulating paper may be a synthetic fiber paper produced by paper making of a synthetic fiber formed of a polymer material. The insulating paper may be in the form of a continuous film in a plane. It is also possible to use two or more sheets of paper or two or more types of insulating papers stacked in a thickness direction.

What is claimed is:

1. A stator comprising:
    a stator core alternately having teeth and slots in a circumferential direction,
    a coil installed at the stator core; and
    insulating papers disposed between an inner circumferential surface of the slots and the coil,
    wherein at least one of the insulating papers has a first side portion which faces one of two teeth on both sides of each of the slots in the circumferential direction, a second side portion which faces the other one of the two teeth, and a third side portion which connects between the first side portion and the second side portion, and the third side portion has at least two folded portions in a lengthwise direction of the slots, each of the slots comprises an opening which is opened between the teeth, and the at least two folded portions comprises a convex shape and a concave shape toward the opening.

2. The stator according to claim 1, wherein the coil and the insulating paper are impregnated with varnish, and the varnish permeates between the coil and the third side portion having the folded portion.

3. A method for manufacturing a stator, comprising:
    preparing a stator core alternately having teeth and slots in a circumferential direction,
    installing a coil at the stator core,
    moving an insulating paper, which has a first side portion which faces one of two teeth on both sides of each of the slots in the circumferential direction, a second side portion which faces the other one of the two teeth and a third side portion which connects between the first side portion and the second side portion and in which the third side portion has at least two folded portions in a lengthwise direction of the slots, in the lengthwise direction of the slots and inserting the insulating paper into the slots, wherein each of the slots comprises an opening which is opened between the teeth, and the at least two folded portions comprises a convex shape and a concave shape toward the opening, and
    disposing the insulating paper between an inner circumferential surface of the slots and the coil.

4. The method according to claim 3, further comprising impregnating the coil and the insulating paper with varnish in a state in which the coil and the insulating paper are arranged in the slots, wherein a gap through which the varnish permeates is provided between the coil and the third side portion having the folded portion.

5. A method for manufacturing a stator, comprising:
    preparing a stator core alternately having teeth and slots in a circumferential direction,
    installing a coil at the stator core,
    moving an insulating paper, which has a first side portion which faces one of two teeth on both sides of each slot in the circumferential direction, a second side portion which faces the other one of the two teeth and a third side portion which connects between the first side portion and the second side portion and in which the third side portion has a folded portion in a lengthwise direction of the slot, in a lengthwise direction of the slot and inserting the insulating paper into the slot,
    disposing the insulating paper between an inner circumferential surface of the slot and the coil, and
    impregnating the coil and the insulating paper with varnish in a state in which the coil and the insulating paper are arranged in the slots, wherein a gap through which the varnish permeates is provided between the coil and the third side portion having the folded portion.

\* \* \* \* \*